United States Patent
Chi

(10) Patent No.: US 7,818,524 B2
(45) Date of Patent: Oct. 19, 2010

(54) DATA MIGRATION SYSTEMS AND METHODS FOR INDEPENDENT STORAGE DEVICE EXPANSION AND ADAPTATION

(75) Inventor: Ling Chi, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 612 days.

(21) Appl. No.: 11/761,000

(22) Filed: Jun. 11, 2007

(65) Prior Publication Data

US 2008/0195808 A1     Aug. 14, 2008

(30) Foreign Application Priority Data

Feb. 14, 2007   (TW) .............................. 96105448 A

(51) Int. Cl.
*G06F 12/16*   (2006.01)
(52) U.S. Cl. .................. 711/165; 711/114; 711/171; 711/172
(58) Field of Classification Search .............. None
See application file for complete search history.

(56) References Cited

U.S. PATENT DOCUMENTS

| | | |
|---|---|---|
| 5,875,457 A | 2/1999 | Shalit |
| 2003/0115412 A1 | 6/2003 | Franklin et al. |
| 2003/0145167 A1* | 7/2003 | Tomita .................. 711/114 |
| 2006/0059306 A1* | 3/2006 | Tseng .................. 711/114 |

FOREIGN PATENT DOCUMENTS

| | | |
|---|---|---|
| CN | 1501364 | 6/2004 |
| CN | 1624670 | 6/2005 |
| TW | 200625088 | 7/2006 |

OTHER PUBLICATIONS

English language translation of abstract of CN 1501364 (published Jun. 2, 2004).
English language translation of abstract of CN 1624670 (published Jun. 8, 2005).
English language translation of abstract of TW 200625088 (published Jul. 16, 2006).

* cited by examiner

*Primary Examiner*—Gary J Portka
(74) *Attorney, Agent, or Firm*—Thomas, Kayden, Horstemeyer & Risley

(57) ABSTRACT

A method of data migration for independent storage device expansion and adaptation is disclosed. The method migrates user data of a first storage unit being pre-expanded or pre-adapted to relevant regions of a second storage unit being post-expanded or post-adapted in multiple batches and includes the following steps. A number corresponding to a start data stripe of the first storage unit is provided in each batch. A data stripe migration quantity is determined. Data stripe user data of the determined data stripe migration quantity subsequent to and including the start data stripe of the first storage unit is duplicated and stored in relevant regions of the second storage unit. Subsequent to duplicating and storing each batch, the original user data of data stripes of the determined data stripe migration quantity subsequent to and including the start data stripe of the first storage unit remains undamaged.

18 Claims, 20 Drawing Sheets

| Disk0 | Disk1 | Disk2 | Disk3 | Disk4 | | Disk5 | Disk6 |
|---|---|---|---|---|---|---|---|
| DS0 | DS1 | DS2 | DS3 | DS4 | | DS5 | DS6 |
| DS7 | DS8 | DS9 | DS10 | DS11 | | DS12 | DS13 |
| DS14 | DS15 | DS16 | DS17 | DS18 | | DS19 | DS20 |
| DS21 | DS22 | DS23 | DS24 | DS25 | | DS26 | DS27 |
| DS28 | DS29 | | | | | | |

FIG. 9h

DATA MIGRATION SYSTEMS AND METHODS FOR INDEPENDENT STORAGE DEVICE EXPANSION AND ADAPTATION

BACKGROUND

The invention relates to independent storage device management, and more particularly, to data migration systems and methods for independent storage device expansion and adaptation.

Redundant array of independent disks (RAID) is a disk subsystem used to increase performance, provide fault tolerance, or both. RAID is equipped with two or more ordinary hard disks and a RAID disk controller. Performance is improved by disk striping, which interleaves bytes or groups of bytes across multiple drives, thus, reading and writing of more than one disk can occur simultaneously. Fault tolerance is achieved by mirroring or disk striping with parity. Mirroring is full duplication of data on two drives. In disk striping with parity, parity is used to calculate the actual data in two drives and store the results on a third drive. After a failed drive is replaced, the disk controller automatically rebuilds the lost data from two remaining drives.

RAID expansion and adaptation, however, requires excessive data migration. Thus, data migration systems and methods for RAID expansion and adaptation capable of reducing migration time, and preventing data loss due to errors are desirable.

SUMMARY

Data migration systems and methods for RAID expansion and adaptation capable of reducing migration time and preventing data loss due to errors are provided.

An embodiment of a method of data migration for independent storage device expansion and adaptation, migrating user data of a first storage unit being pre-expanded or pre-adapted to relevant regions of a second storage unit being post-expanded or post-adapted in multiple batches, comprises the following steps. During each batch, a number corresponding to a start data stripe of the first storage unit is provided. A data stripe migration quantity is determined. User data of the determined data stripe migration quantity subsequent to and including the start data stripe of the first storage unit is duplicated and stored in relevant regions of the second storage unit. Subsequent to duplicating and storing each batch, the original user data of data stripes of the determined data stripe migration quantity subsequent to and including the start data stripe of the first storage unit remains undamaged.

An embodiment of a system of data migration for independent storage device expansion and adaptation comprises a controller. A controller migrates user data of a first storage unit being pre-expanded or pre-adapted to relevant regions of a second storage unit being post-expanded or post-adapted in multiple batches. During each batch, the controller provides a number corresponding to a start data stripe of the first storage unit, determines a data stripe migration quantity, and duplicates and stores user data of data stripes of the determined data stripe migration quantity subsequent to and including the start data stripe of the first storage unit in relevant regions of the second storage unit. Subsequent to duplicating and storing each batch, the original user data of data stripes of the determined data stripe migration quantity subsequent to and including the start data stripe of the first storage unit remains undamaged.

BRIEF DESCRIPTION OF DRAWINGS

The invention will become more fully understood by referring to the following detailed description with reference to the accompanying drawings, wherein:

FIGS. 9a to 9h are diagrams illustrating data migration of RAID0 expansion at different times;

DETAILED DESCRIPTION

Figure 1:
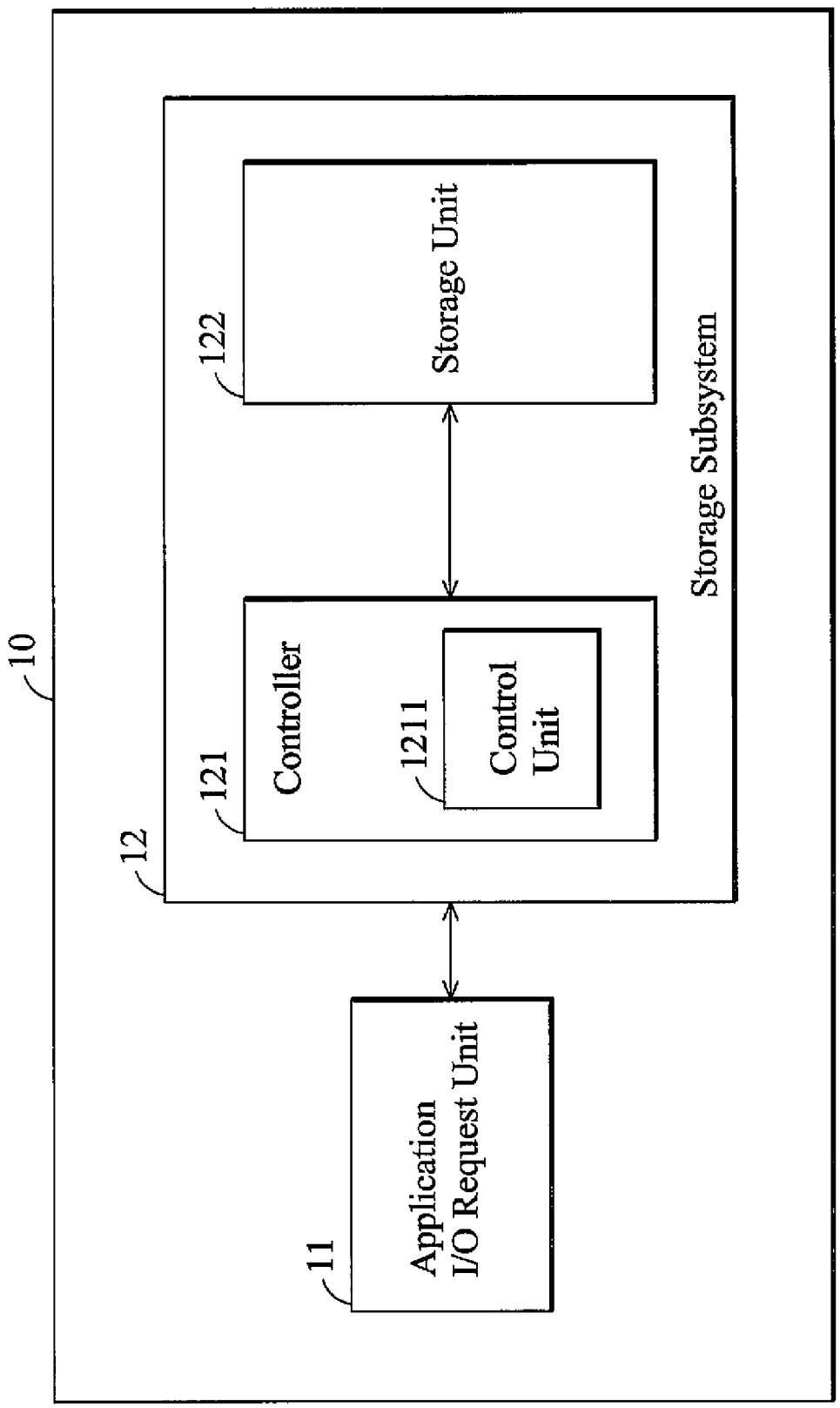
FIG. 1 is a diagram of hardware architecture applicable to an embodiment of a data access system.

FIG. 1 is a diagram of hardware architecture applicable to an embodiment of a data access system 10 comprising an application I/O request unit 11, and a storage subsystem 12, where the application I/O request unit 11 may be a network computer, a mini-computer, a mainframe computer, a notebook, or an electronic device required to retrieve data from the storage subsystem 12, such as a digital personal assistant (PDA), digital recorder, digital music player, and the like. The storage subsystem 12 comprises a controller 121, and a storage unit 122. The controller comprises a control unit 1211. The storage unit 122 is equipped with multiple storage devices, such as tape drives, disk drives, memory drives, optical storage drives, or equivalent drives. When performing independent storage expansion and adaptation, the control unit 1211 executes various data migration algorithms for reducing migration time, and preventing unexpected data loss due to errors.

Figure 2:
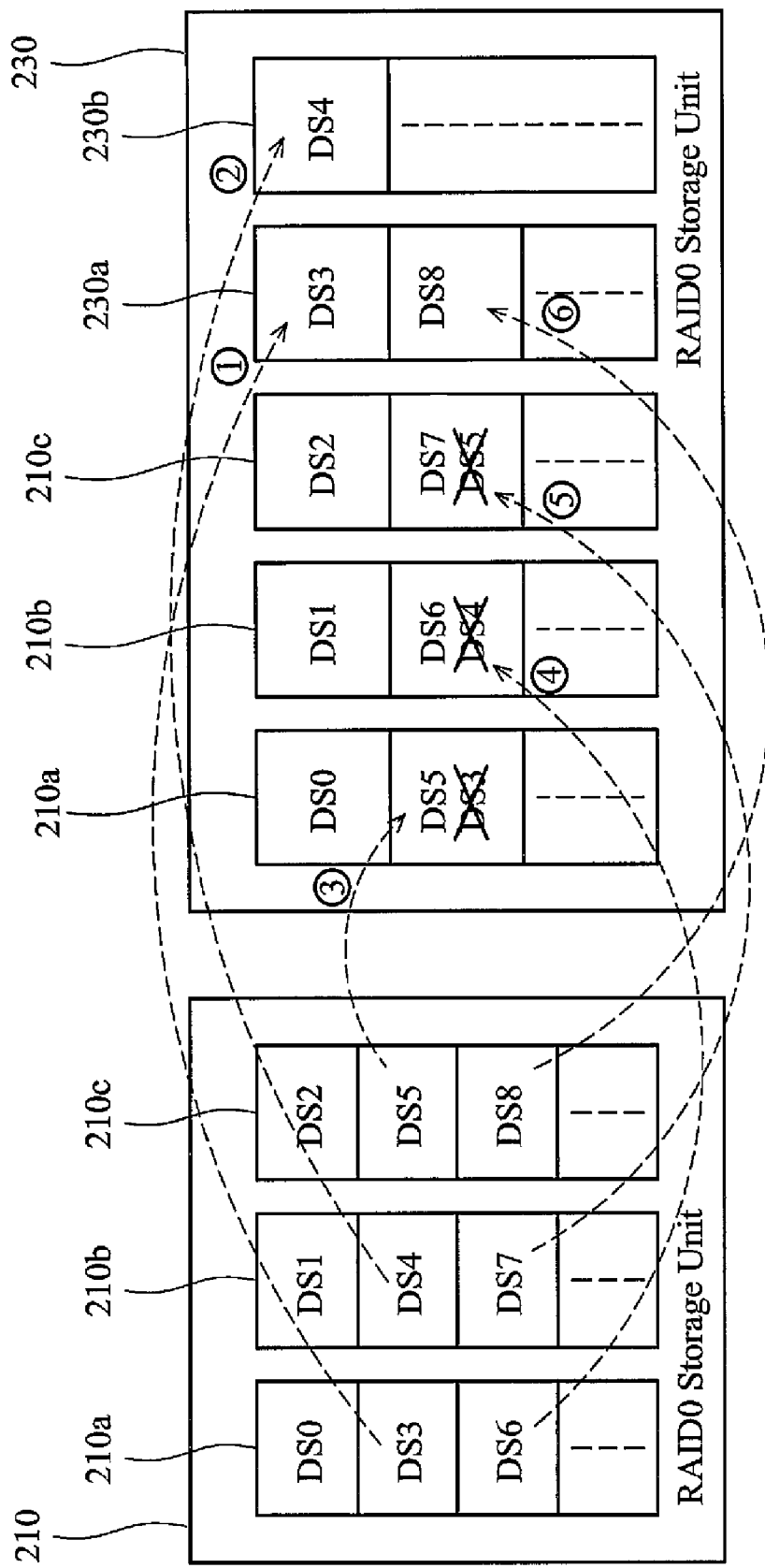
FIGS. 2 and 3 are diagrams of embodiments of data migration for redundant array of independent disks (RAID) expansion.

FIG. 2 is a diagram of an embodiment of data migration for redundant array of independent disks (RAID) expansion. Initial RAID0 storage unit 210 contains three independent disks 210a to 210c, where the disk 210a contains data stripes DS0, DS3, DS6, and others, the disk 210b contains data stripes DS1, DS4, DS7, and others, and the disk 210c contains data stripes DS2, DS5, DS8, and others. Each data stripe stores user data. After RAID expansion, the RAID0 storage unit 230 further adds two independent disks 230a to 230b. Subsequently, during data migration, as shown in FIG. 2, data of the original data stripes DS3, DS4, DS5, DS6, DS7, and DS8 is sequentially duplicated to relevant regions of the disks 230a, 230b, 210a, 210b, 210c, and 230a. Note that, during data migration, data of the original data stripes DS3 to DS5 is sequentially overwritten by data of the data stripes DS5 to DS7.

Figure 3:
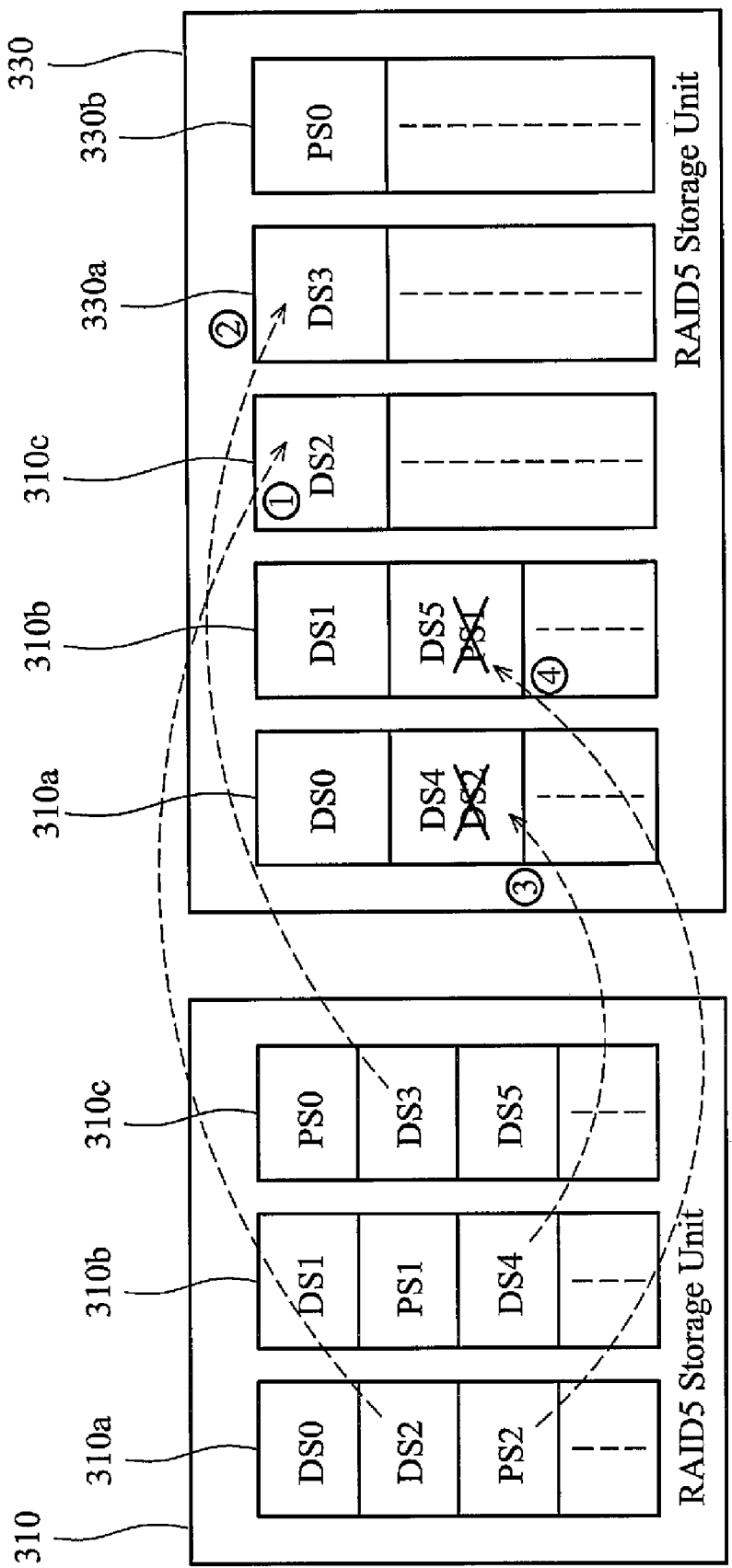

FIG. 3 is a diagram of an embodiment of data migration for RAID expansion. Initial RAID5 storage unit 310 contains three independent disks 310a to 310c, where the disk 310a contains data stripes DS0, DS2, and others, and parity stripes PS2, and others, the disk 310b contains data stripes DS1, DS4, and others, and parity stripes PS1, and others, and the disk 210c contains data stripes DS3, DS5, and others, and parity stripes PS0, and others. Each data stripe stores user data, and each parity stripe stores parity data corresponding to user data of two data stripes to improve fault tolerance. For example, a parity bit of the parity stripe PS0 is generated by the following. A bit from the data stripe DS0 is XOR'd with a bit from the data stripe DS1, and the result is stored in the disk 310c. After RAID expansion, the RAID5 storage unit 330 further adds two independent disks 330a to 330b. Subsequently, during data migration, as shown in FIG. 3, data of the original data stripes DS2, DS3, DS4, and DS5 is sequentially duplicated to relevant regions of the disks 310c, 330a, 310a, and 310b. Note that, during data migration, data of the original parity stripe PS0, data stripe DS2, and parity stripe PS1 is sequentially overwritten by data of the data stripes DS2, DS4, and DS5. It is to be understood that data of the original parity stripes is not processed, and parity data of the parity stripe PS0 of the disk 330b is calculated according to user data of the migrated data stripes DS0 to DS3.

Figure 4:
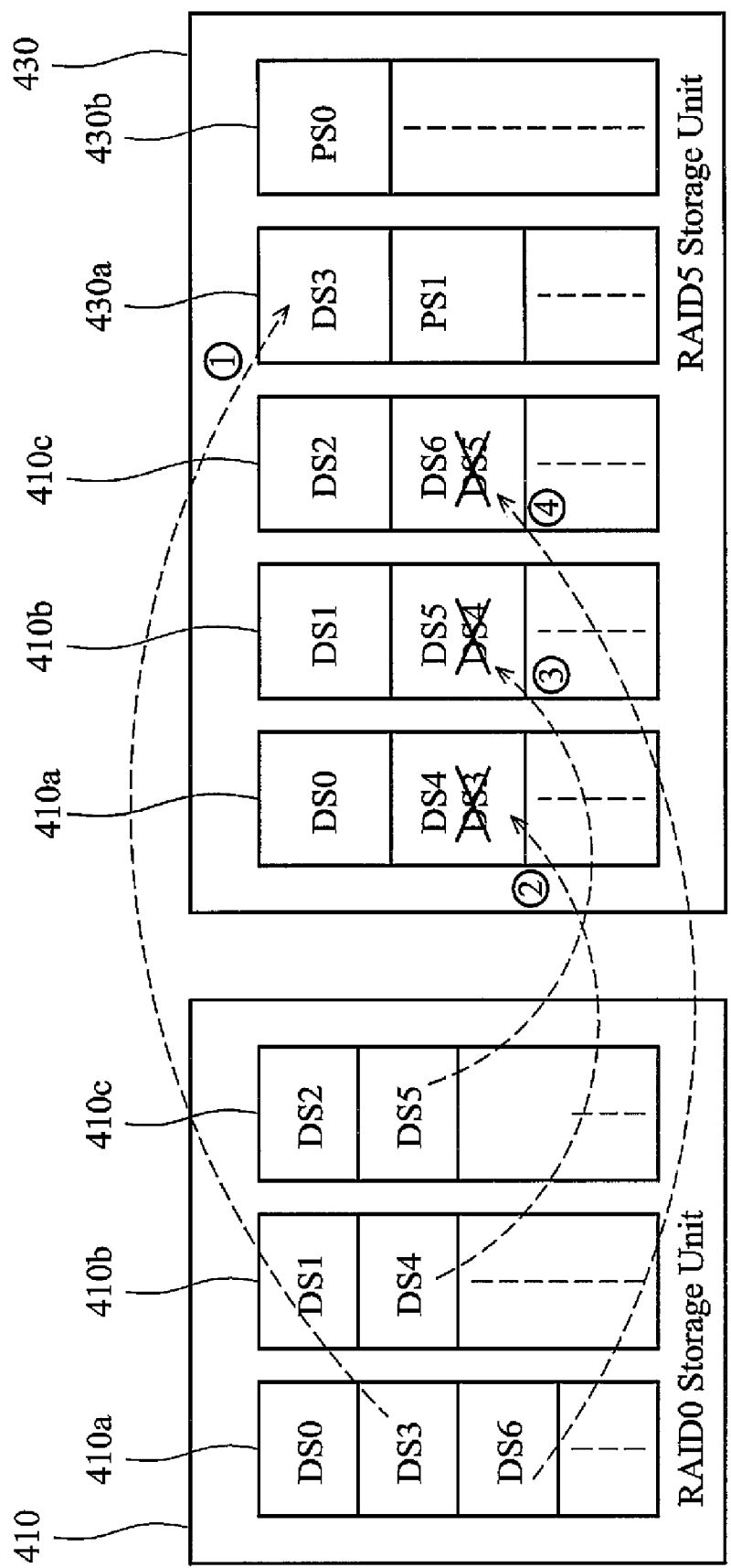
FIGS. 4 and 5 are diagrams of embodiments of data migration for RAID adaptation.

FIG. 4 is a diagram of an embodiment of data migration for RAID adaptation. Initial RAID0 storage unit 410 contains three independent disks 410a to 410c, where the disk 410a contains data stripes DS0, DS3, DS6, and others, the disk 410b contains data stripes DS1, DS4, and others, and the disk 410c contains data stripes DS2, DS5, and others. Each data stripe stores user data. After RAID adaptation (from RAID0 to RAID5), two independent disks 430a to 430b are added to the RAID5 storage unit 430. Subsequently, during data migration, as shown in FIG. 4, data of the original data stripes DS3, DS4, DS5, and DS6 is sequentially duplicated to relevant regions of the disks 430a, 410a, 410b, and 410c. Note that, during data migration, data of the original data stripes DS3, DS4, and DS5 is sequentially overwritten by data of the data stripes DS4, DS5, and DS6. It is to be understood that parity data of the parity stripe PS0 of the disk 430b is calculated according to user data of the migrated data stripes DS0 to DS3. Each parity stripe stores parity data corresponding to user data of four data stripes to improve fault tolerance. For example, a parity bit of the parity stripe PS0 is generated by performing a bitwise XOR operation to a bit of the data stripe DS0, a bit of the data stripe DS1, a bit of the data stripe DS2, and a bit of the data stripe DS3, and is stored in the disk 430b.

Figure 5:
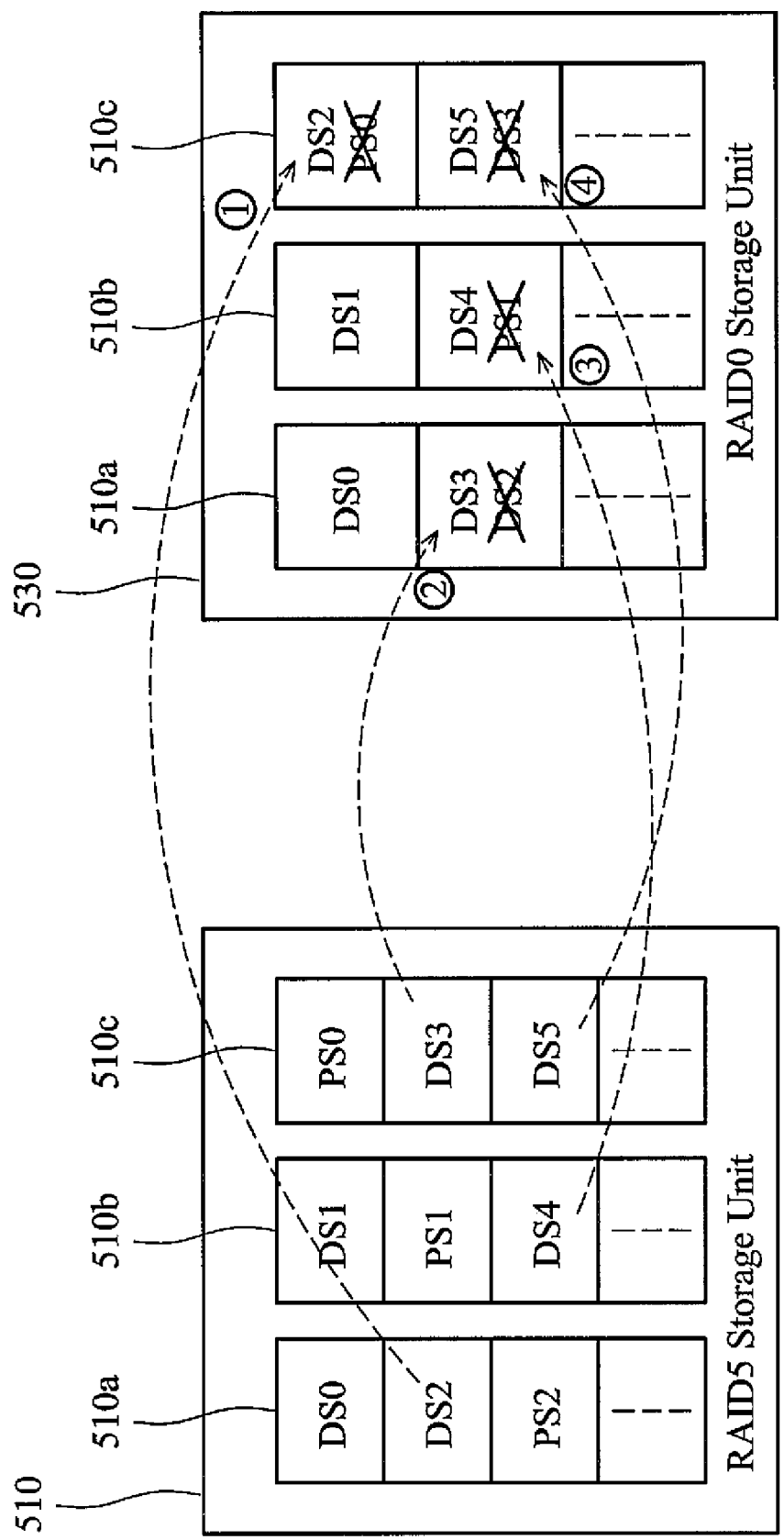

FIG. 5 is a diagram of an embodiment of data migration for RAID adaptation. Initial RAID5 storage unit 510 contains three independent disks 510a to 510c, where the disk 510a contains data stripes DS0, DS2, and others, and parity stripes PS2, and others, the disk 510b contains data stripes DS1, DS4, and others, and parity stripes PS1, and others, and the disk 510c contains data stripes DS3, DS5, and others, and parity stripes PS0, and others. Each data stripe stores user data, and each parity stripe stores parity data corresponding to user data of two data stripes to improve fault tolerance. The RAID adaptation adjusts RAID5 to RAID0. During data migration, as shown in FIG. 5, data of the original data stripes DS2, DS3, DS4, and DS5 is sequentially duplicated to relevant regions of the disks 510c, 510a, 510b, and 510c. Note that, during data migration, data of the original parity stripe PS0, data stripe DS2, parity stripe PS1, and data stripe DS3 is sequentially overwritten by data of the data stripes DS2, DS3, DS4, and DS5. It is to be understood that data of the original parity stripes is not processed because RAID0 does not store parity data.

Figure 6:
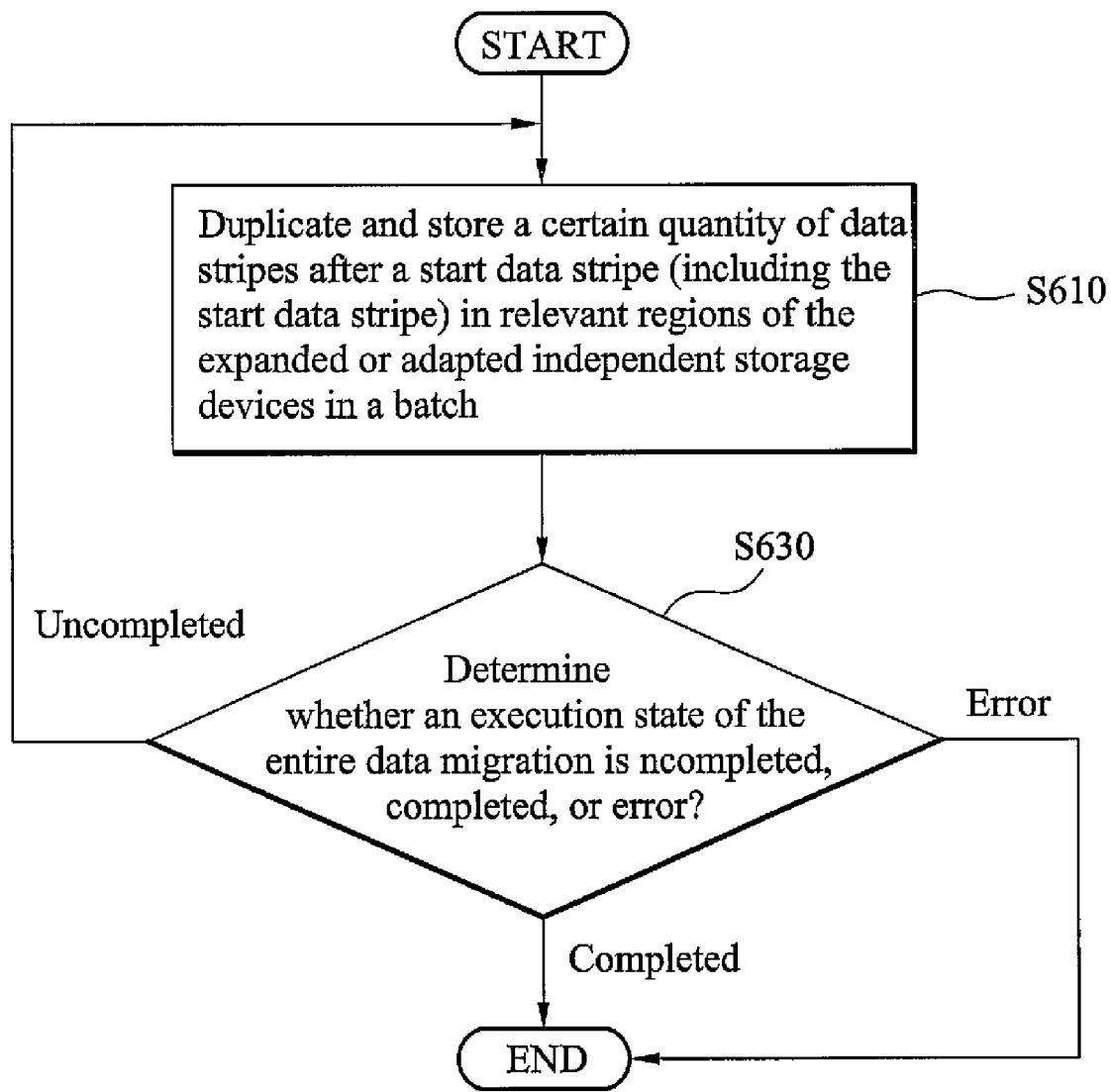
FIG. 6 is a flowchart illustrating an embodiment of a data migration method for independent storage device expansion and adaptation.

FIG. 6 is a flowchart illustrating an embodiment of a data migration method for independent storage device expansion and adaptation, executed by a control unit (e.g. 1211 of FIG. 1). The method migrates a certain quantity of data stripes after a start data stripe (including the start data stripe) to relevant regions of the expanded or adapted independent storage devices in a batch. Except for migration of the first batch, a start data stripe of each batch is the next data stripe of the last migrated data stripe in the prior batch. Specifically, in step S610, a certain quantity of data stripes after a start data stripe (including the start data stripe) are duplicated and stored in relevant regions of the expanded or adapted independent storage devices in a batch. Note that, the determined quantity of data stripes for migration in one batch by this step should guarantee that any data of the duplicated data stripes is not overwritten during data migration of the batch. When an error occurs during data migration of one batch, and the original data of the duplicated data stripe is overwritten, the overwritten data is lost permanently and can not be recovered by re-executing data migration for uncompleted data stripes in a batch. In step S630, an execution state of the entire data migration is determined. The process proceeds to step S610 for the next batch of migrating data stripes when the execution state indicates that the entire data migration is not complete. The process ends when the execution state indicates that the entire data migration is complete, or an error has occurred during data migration.

Figure 7A:
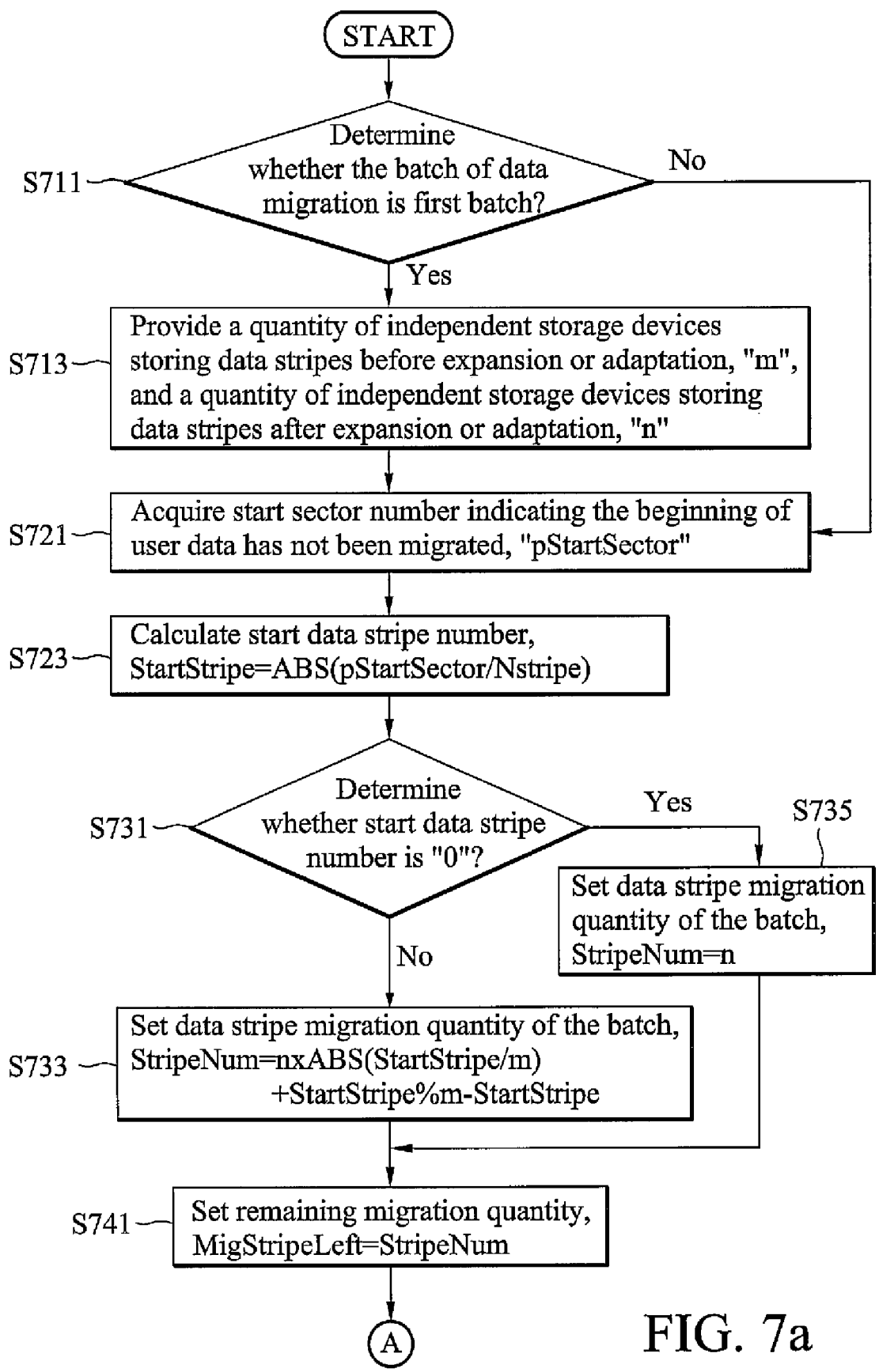
FIGS. 7a and 7b are flowcharts illustrating an embodiment of a data migration method for independent storage device expansion and adaptation.
Figure 7B:
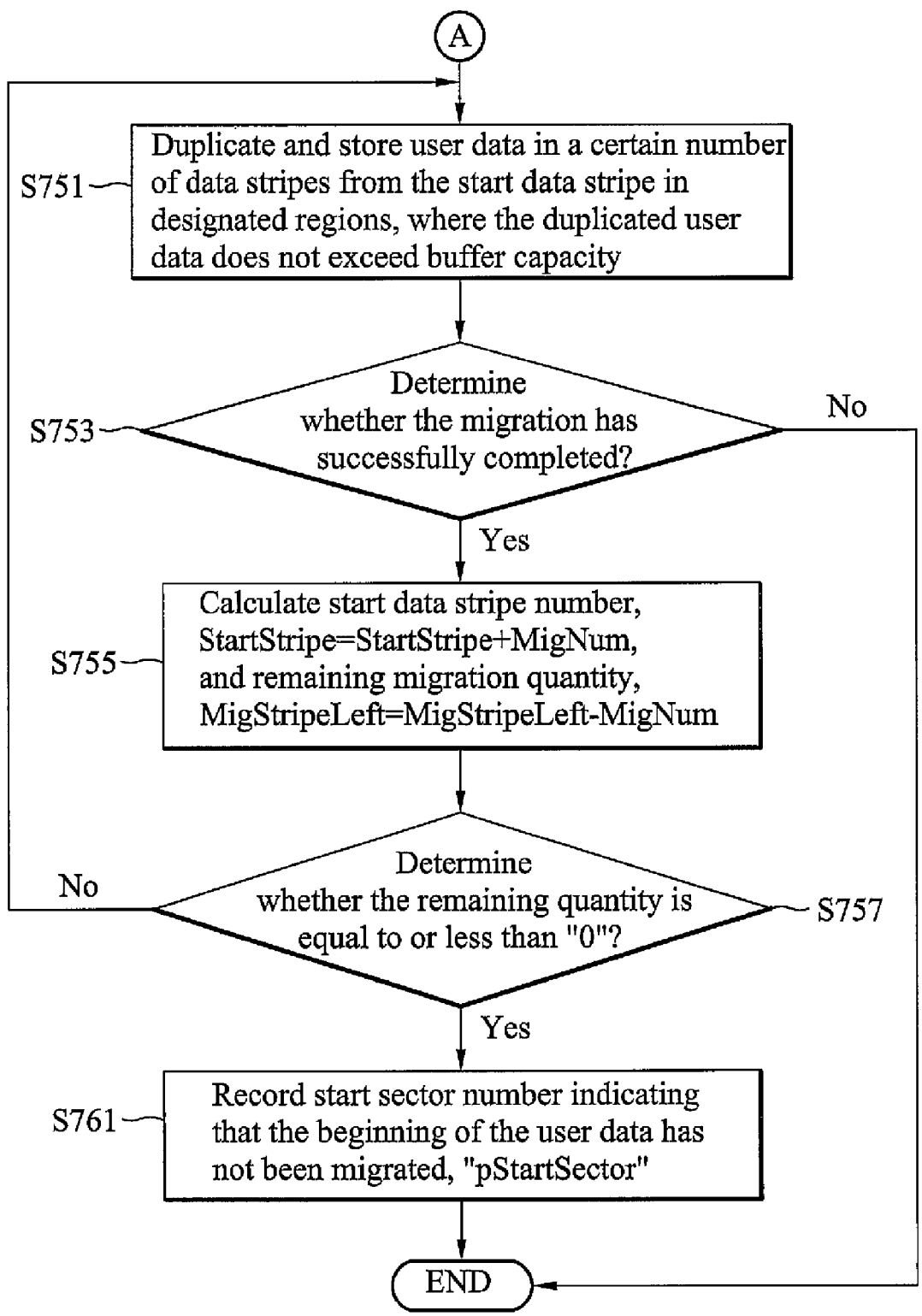

FIGS. 7a and 7b are flowcharts illustrating an embodiment of a data migration method for independent storage device expansion and adaptation, executed by a control unit (e.g. 1211 of FIG. 1). The flowcharts show the process steps of step S610 (FIG. 6) in detail. In step S711, it is determined whether the batch of data migration is a first batch. If so, the process proceeds to step S713, otherwise, to step S721. In step S713, a quantity of independent storage devices storing data stripes before expansion or adaptation, denoted as "m", and a quantity of independent storage devices storing data stripes after expansion or adaptation, denoted as "n", are provided. For example, referring to FIG. 2 illustrating RAID0 expansion, "m" is three, and "n" is five. Referring to FIG. 3 illustrating RAID5 expansion, RAID5 system utilizes one independent disk to store parity data, thus, "m" is two (three minus one), and "n" is four (five minus one). Referring to FIG. 4 illustrating adaptation from RAID0 to RAID5, RAID5 system utilizes one independent disk to store parity data, thus, "m" is three, and "n" is four (five minus one). Referring to FIG. 5 illustrating adaptation from RAID5 to RAID0, RAID5 system utilizes one independent disk to store parity data, thus, "m" is two (three minus one), and "n" is three.

In step S721, a start sector number indicating the beginning of user data has not been migrated, denoted as "pStartSector", is acquired. Those skilled in the art may understand that sector is the minimum unit for storing data in RAID system, and each sector has an identical serial number. The start sector number "pStartSector" is preferably recorded in the last sector of the last storage device subsequent to data migration in one batch. In step S723, a start data stripe number, denoted as "StartStripe", is calculated. The start data stripe number "StartStripe" may be calculated by a formula, $$\text{StartStripe} = ABS(p\text{StartSector}/N_{stripe}),$$

where "StartStripe" represents a start data stripe number, ABS( ) represents a function for acquiring a absolute value, "pStartSector" represents a start sector number, "$N_{stripe}$" represents a total amount of sectors of each data stripe.

Steps S731 to S735 are kernel steps for determining a total quantity of data stripes for migration in the batch, thereby ensuring that no data of the duplicated data stripes is overwritten (i.e. damaged) during data migration of the batch. In step S731, it is determined whether the start data stripe number is "0" (i.e. representing the beginning data stripe). If so, the process proceeds to step S735, otherwise, to step S733. In step S735, a data stripe migration quantity of the batch, denoted as "StripeNum", is set to the quantity of the independent storage devices "n" storing data stripes after expansion or adaptation. In step S733, the data stripe migration quantity of the batch may be calculated by a formula, $$StripeNum = n \times ABS(StartStripe/m) + StartStripe \% m - StartStripe,$$

where "StripeNum" represents the quantity of data stripes for migration in the batch, ABS( ) represents a function for acquiring a absolute value, "StartStripe" represents a start data stripe number, "n" represents the quantity of independent storage devices after expansion or adaptation, and "m" represents the quantity of independent storage devices before expansion or adaptation.

In step S741, a remaining migration quantity denoted as "MigStripeLeft" is set to the data stripe migration quantity "StartStripe". Due to limited buffer capacity, data stripes of the data stripe migration quantity may not be migrated to relevant regions at the same time. Thus, a loop containing steps S751 to S757 is repeatedly executed, and in each run, the largest possible number of data stripes in a buffer is migrated. In step S751, user data in a certain number of data stripes from the start data stripe is duplicated and stored in designated regions, where the duplicated user data does not exceed buffer capacity. The relevant regions may be determined by utilizing well-known algorithms, and is thus only briefly described herein. In step S753, it is determined whether the migration, by step S751, has successfully completed. If so, the process proceeds to step S755, otherwise, the process ends. It is to be understood that the process returns to step S630 when the migration fails, and the execution state determined by S630 indicates that an error has occurred during data migration. In step S755, the start data stripe number and a remaining migration quantity, denoted as "StartStripe" and "MigStripeLeft", are calculated. The start data stripe number "StartStripe" and remaining migration quantity "MigStripeLeft" may be calculated by formulae, $$StartStripe = StartStripe + MigNum,$$

$$MigStripeLeft = MigStripeLeft - MigNum,$$

where "StartStripe" represents a start data stripe number, and "MigNum" represents a data stripe quantity whose size does not exceed buffer capacity. In step S757, it is determined whether the remaining quantity is equal to or less than "0". If so, the process proceeds to step S761, otherwise, to step S751. In step S761, a start sector number indicating that the beginning of the user data has not been migrated, denoted as "pStartSector", is recorded. Step S761 may record the start sector number in the last sector of the last storage device. It is to be understood that the process returns to step S630 when the migration of the batch is successfully completed, and the execution state determined by S630 indicates that the migration of the batch is successfully performed.

Figure 8:
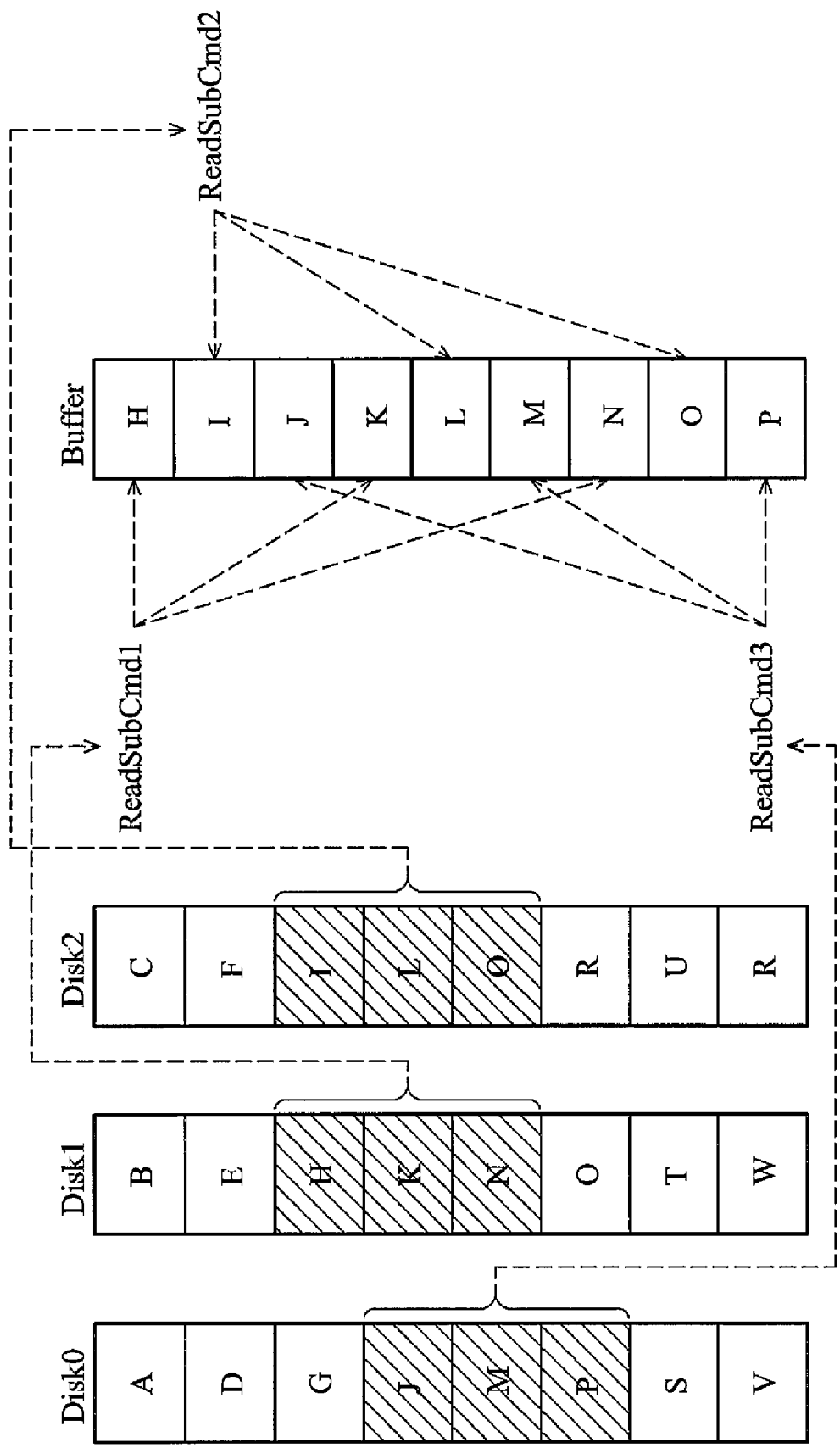
FIG. 8 is a diagram of exemplary data stripe reading optimization procedures.

When performing step S751, the system typically requires allocating computation resources for each read command. In order to reduce a read command quantity, step S751 may further employ a data stripe reading optimization procedure to merge several read commands for reading user data in successive data stripes of an independent disk into a single read command. FIG. 8 is a diagram of exemplary data stripe reading optimization procedures, wherein a buffer stores user data of nine data stripes. For instance, in step S751, during user data migration of nine data stripes H to P to relevant regions, a command "ReadSubCmd1" is first executed to read and store user data of data stripes H, K, and N, of disk 1, in relevant regions of the buffer at one time. Subsequently, a command "ReadSubCmd2" is executed to read and store user data of data stripes I, L, and O, of disk 2, in relevant regions of the buffer at one time. And finally, a command "ReadSubCmd3" is executed to read user data of data stripes J, M, and P, of disk 0, and store in relevant regions of the buffer at one time.

Figure 9A:
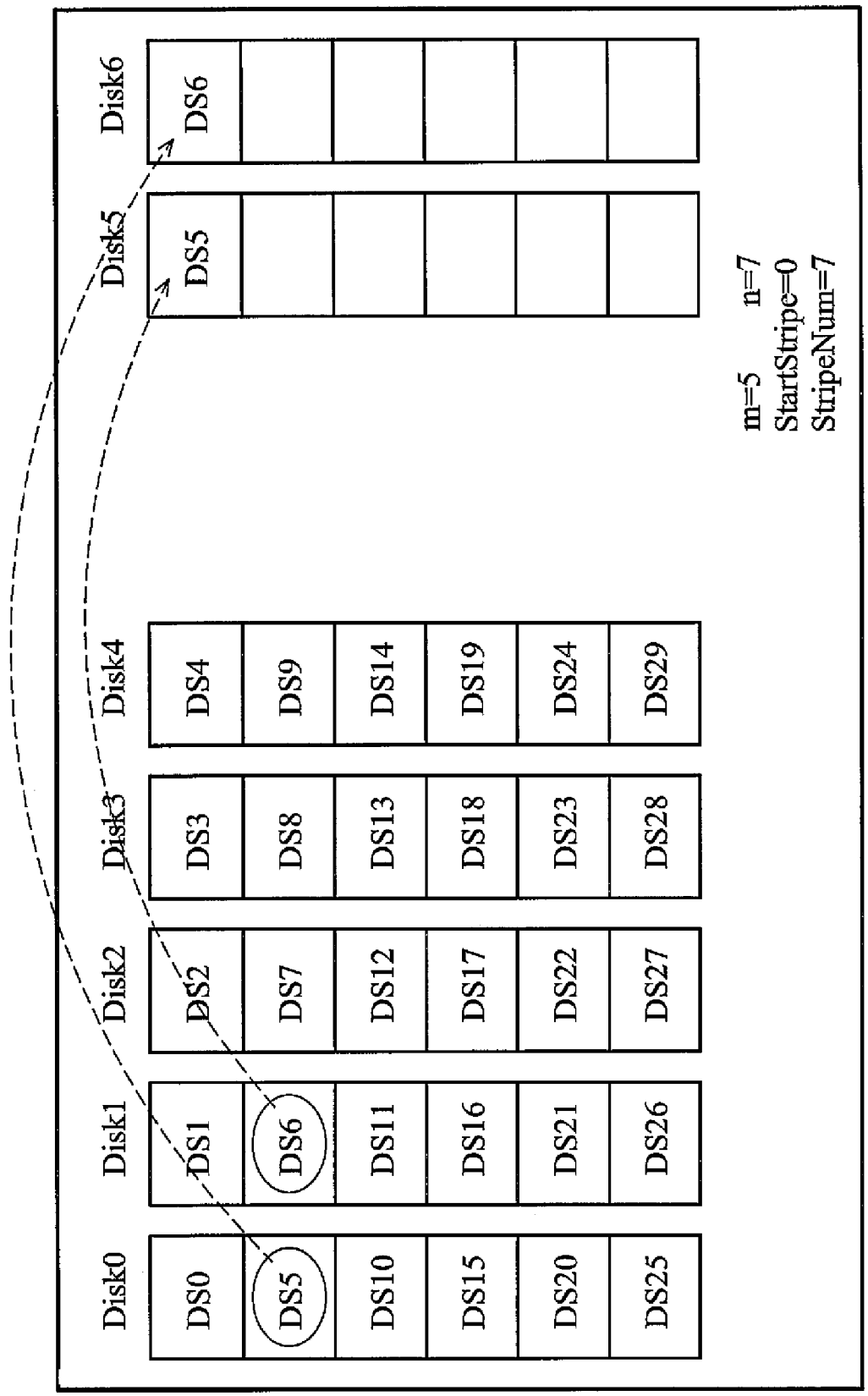
Figure 9B:
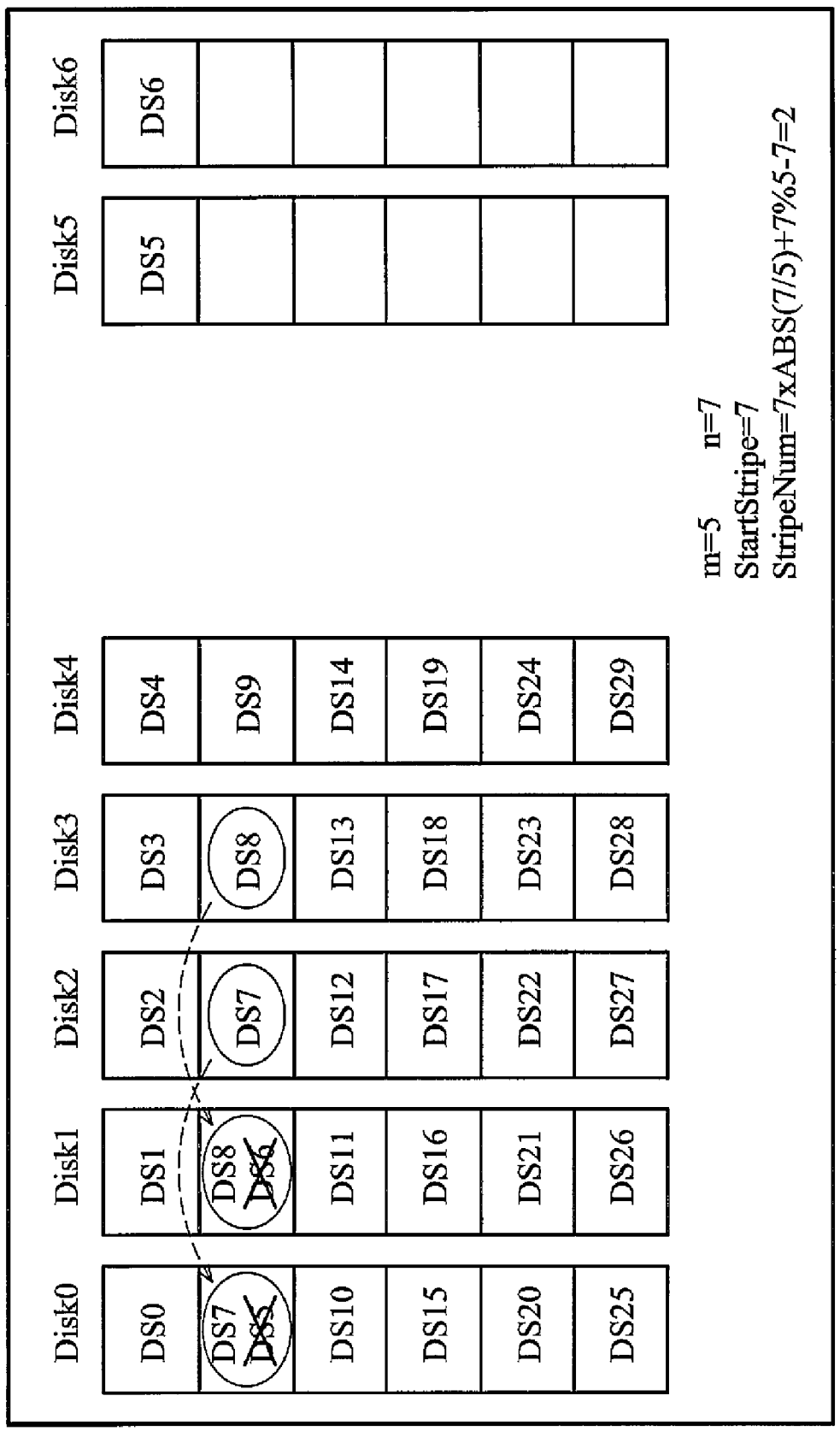
Figure 9C:
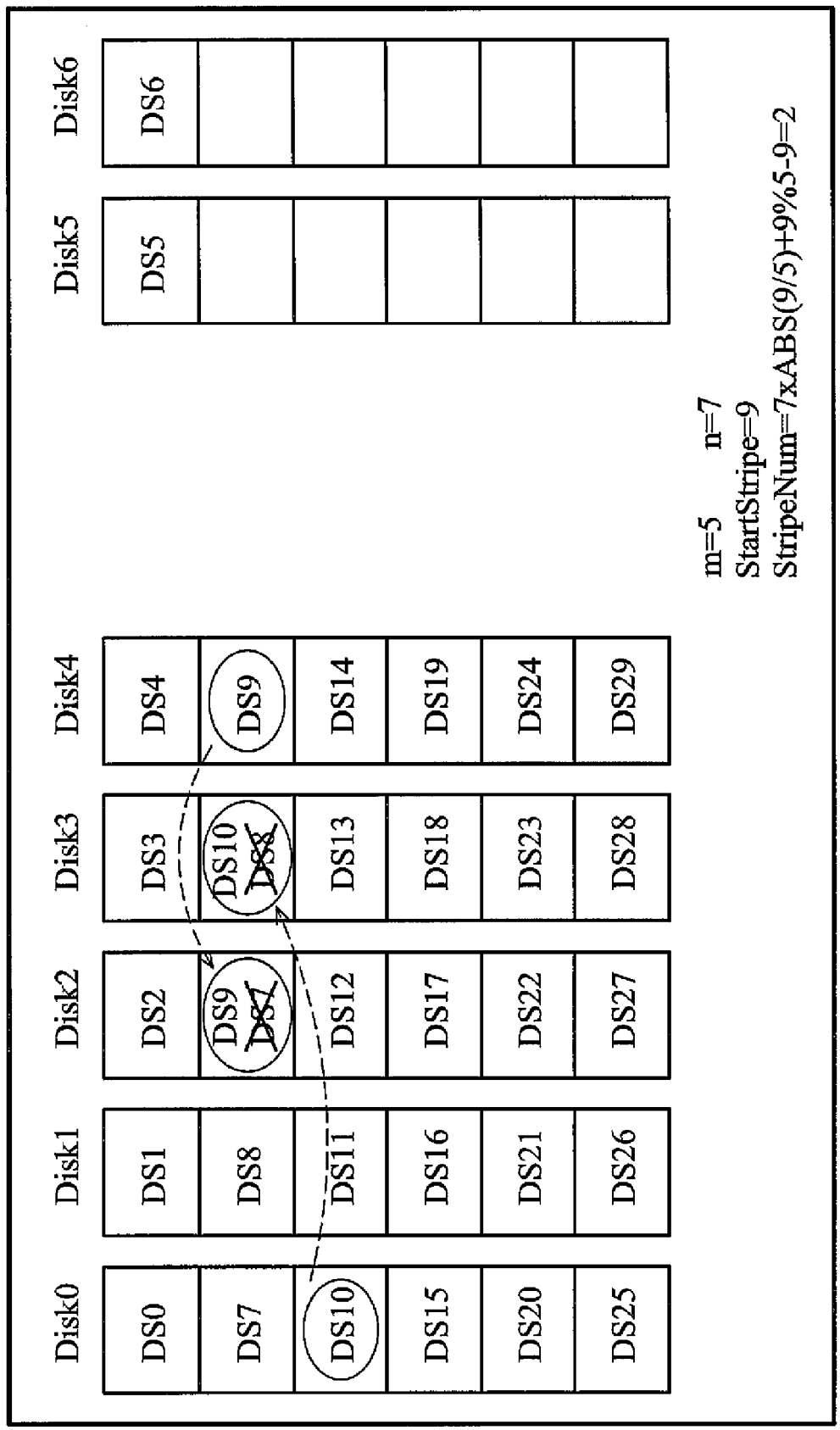
Figure 9D:
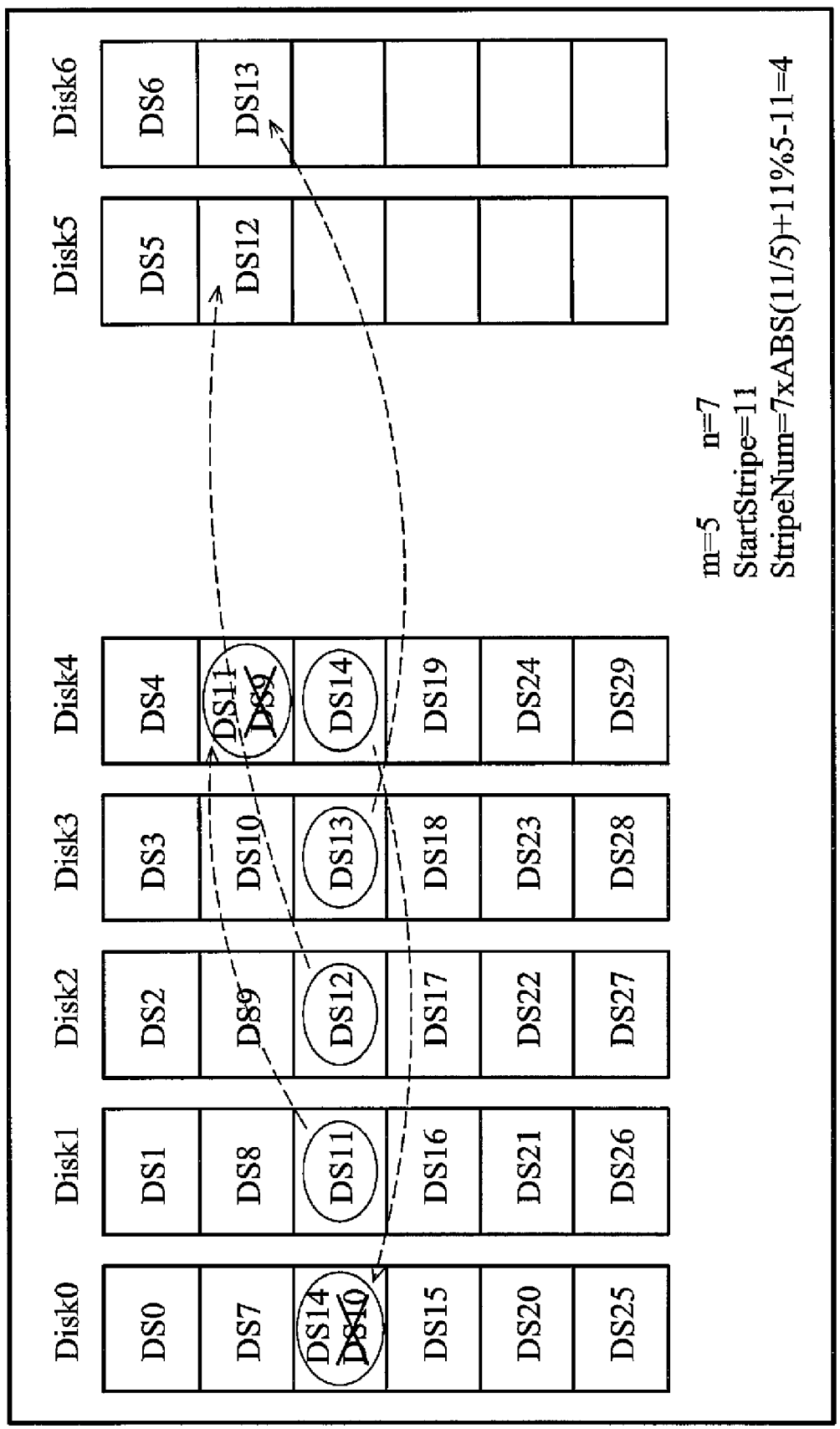
Figure 9E:
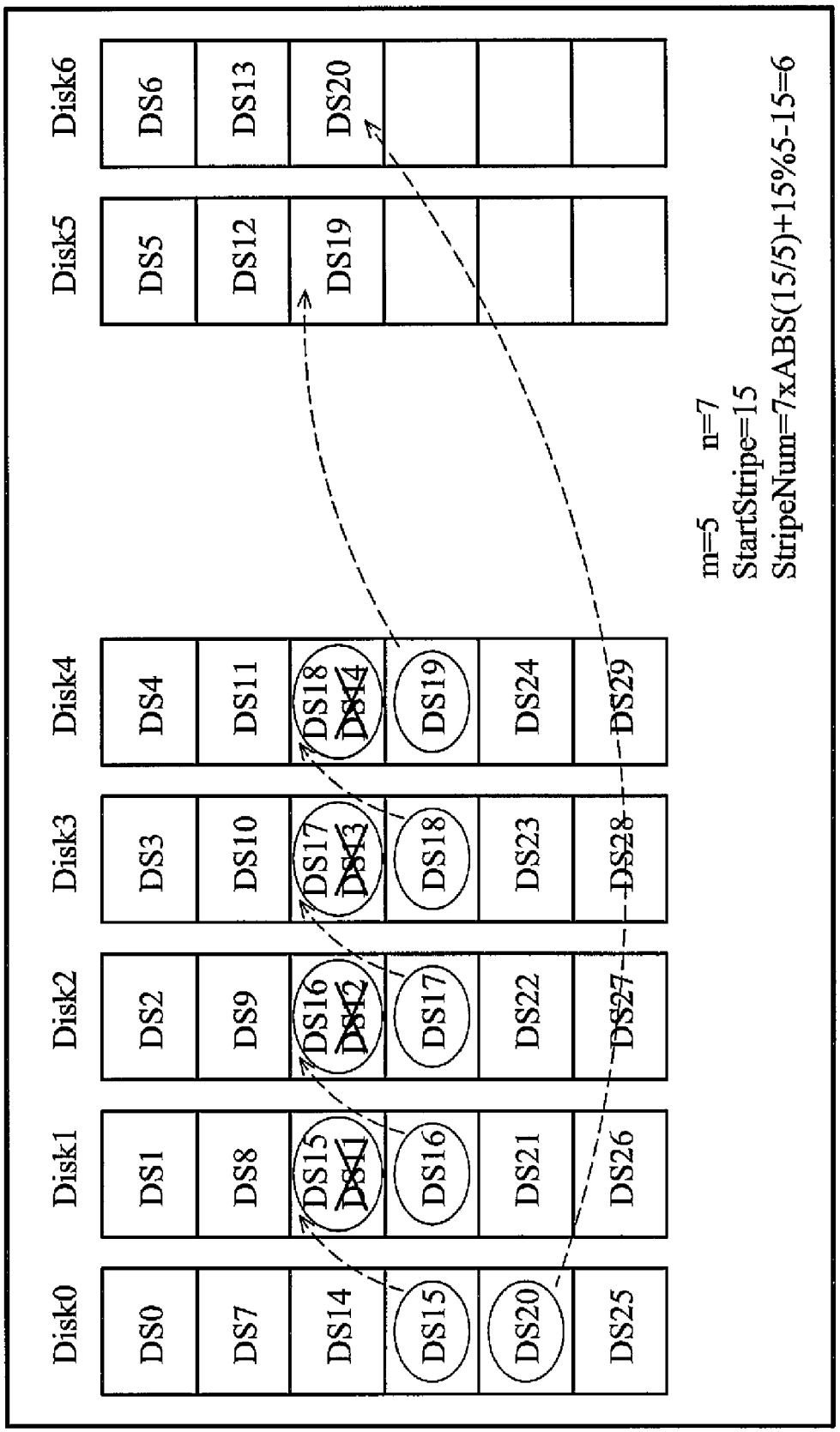
Figure 9F:
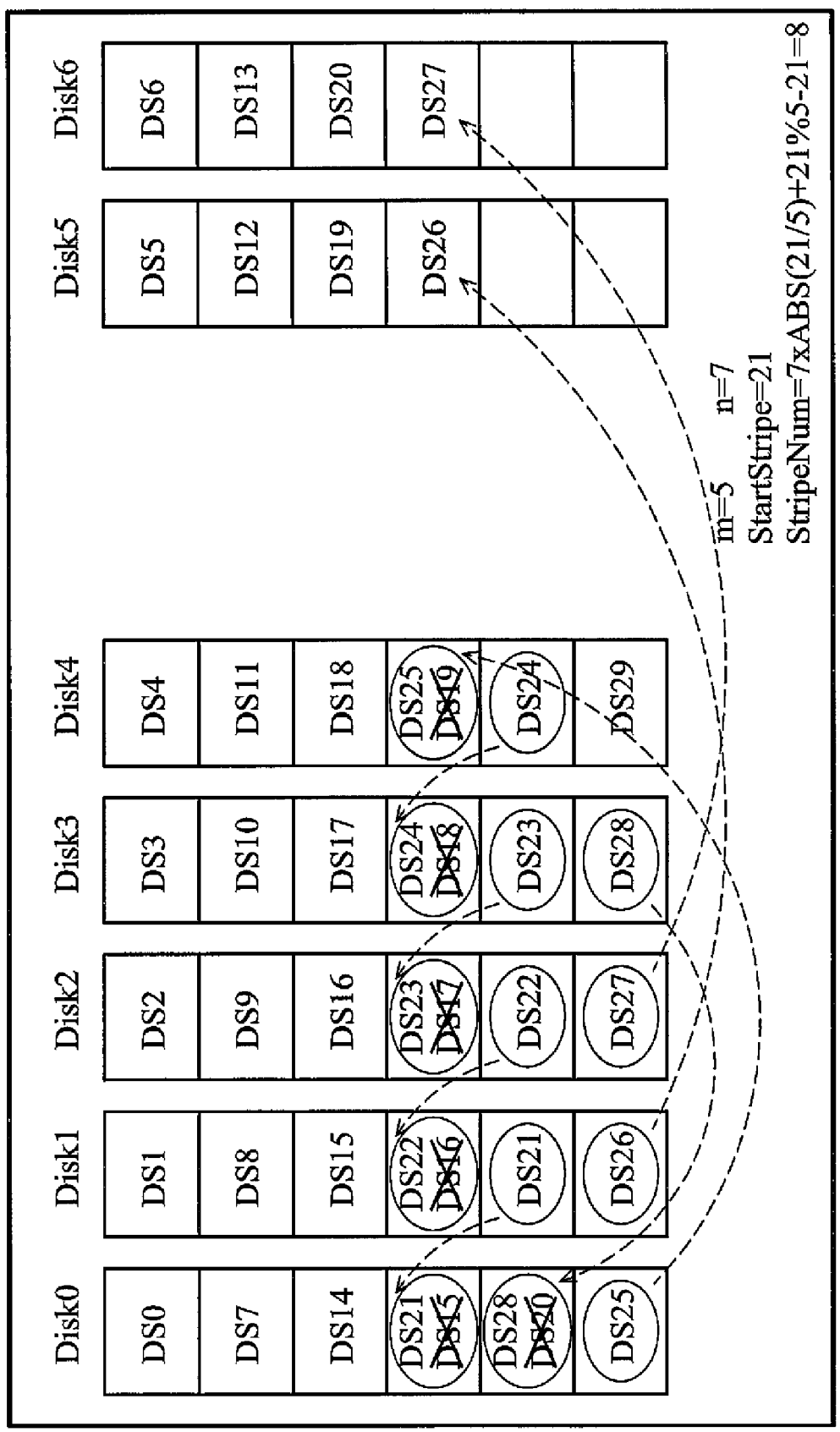
Figure 9G:
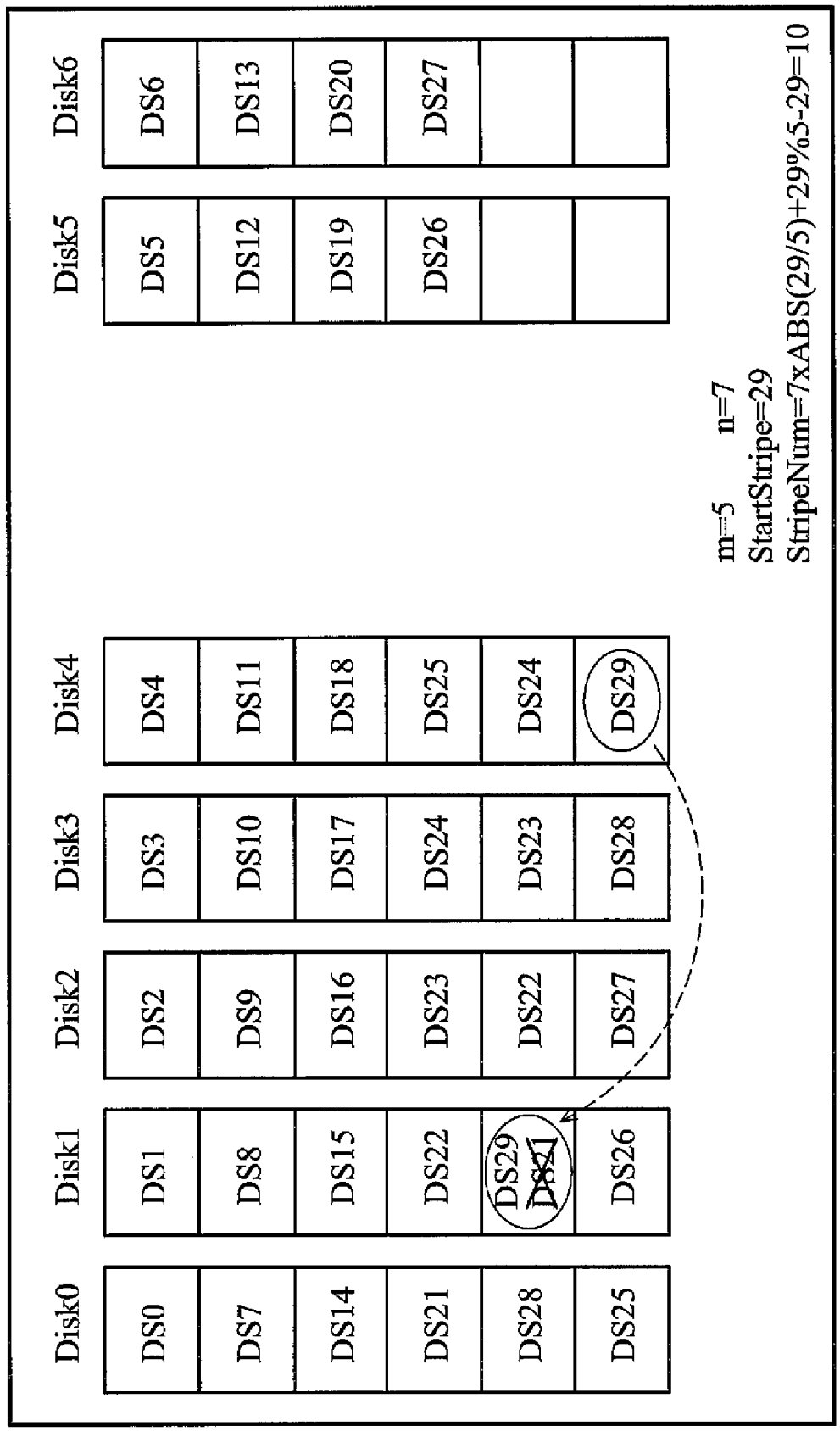

Detailed descriptions of examples for data migration of independent storage device expansion are provided. Suppose that an original RAID0 storage unit contains five independent disks Disk0 to Disk4, and two independent disks, Disk5 and Disk6, are added to the RAID0 storage unit after expansion. FIGS. 9a to 9h are diagrams illustrating data migration of RAID0 expansion at different times. In this example, an independent disk quantity "m" is 5 before expansion, and an independent disk quantity "n" is 7 after expansion. Referring to FIG. 9a, in a first migration batch, the quantity of data stripes for migration "StripeNum" is set to 7 (referring to step S735 of FIG. 7a). Only user data of data stripes DS5 and DS6, however, is duplicated and stored in relevant regions of disks Disk5 and Disk6 in sequence because data stripes DS0 to DS4 are already present in designated regions. Referring to FIG. 9b, in a second migration batch, the calculated data stripe migration quantity "StripeNum" is 2 (referring to step S733 of FIG. 7a), thus, user data of data stripes DS7 and DS8 is duplicated and stored in relevant regions of disks Disk0 and Disk1 in sequence. Referring to FIG. 9c, in a third migration batch, the calculated data stripe migration quantity "StripeNum" is 2 (referring to step S733 of FIG. 7a), thus, user data of data stripes DS9 and DS10 is duplicated and stored in relevant regions of disks Disk2 and Disk3 in sequence. Referring to FIG. 9d, in a fourth migration batch, the calculated data stripe migration quantity "StripeNum" is 4 (referring to step S733 of FIG. 7a), thus, user data of data stripes DS11 and DS14 is duplicated and stored in relevant regions of disks Disk4, Disk5, Disk6 and Disk0 in sequence. Referring to FIG. 9e, in a fifth migration batch, the calculated data stripe migration quantity "StripeNum" is 6 (referring to step S733 of FIG. 7a), thus, user data of data stripes DS15 and DS20 is duplicated and stored in relevant regions of disks Disk1 to Disk6 in sequence. Referring to FIG. 9f, in a sixth migration batch, the calculated data stripe migration quantity "StripeNum" is 8 (referring to step S733 of FIG. 7a), thus, user data of data stripes DS21 and DS28 is duplicated and stored in relevant regions of disks Disk0 to Disk6 in sequence. Referring to FIG. 9g, in a seventh migration batch, the calculated data stripe migration quantity "StripeNum" is 10 (referring to step S733 of FIG. 7a). Only user data of a data stripe DS29, however, is duplicated and stored in a relevant region of a disk Disk1 because only one data stripe remains. It is to be understood that, after data migration of seven batches, user data of original data stripes DS22 to DS29 is erased, the results as shown in FIG. 9h.

Figure 10B:
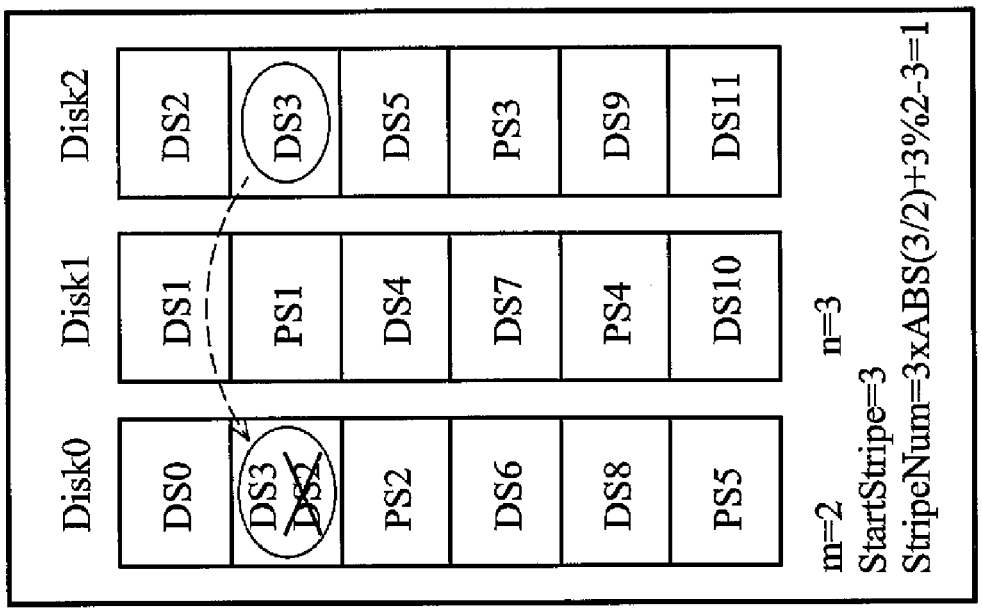
FIGS. 10a to 10f are diagrams illustrating data migration of RAID5 to RAID0 adaptation at different times.
Figure 10A:
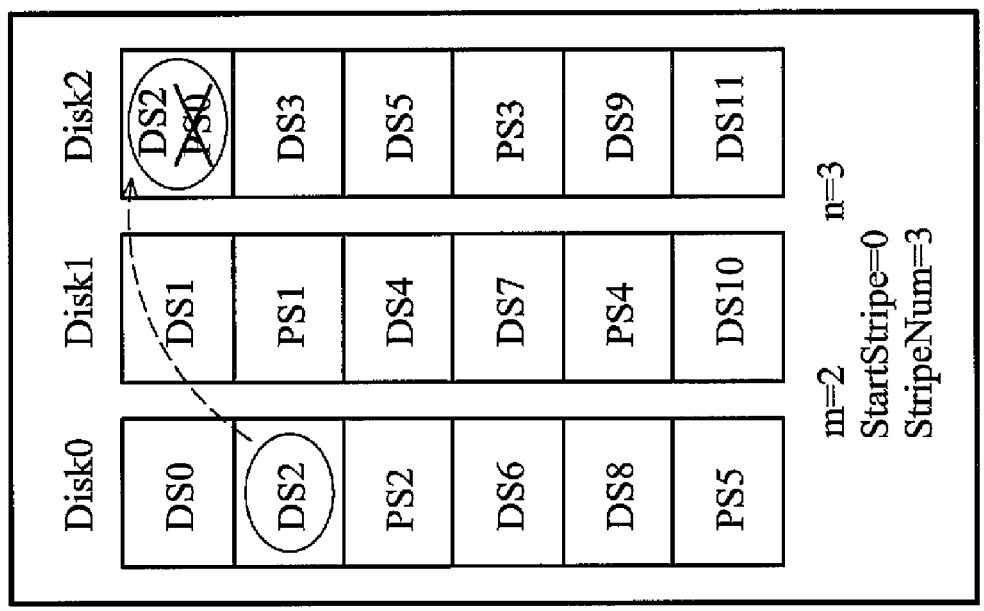
Figure 10D:
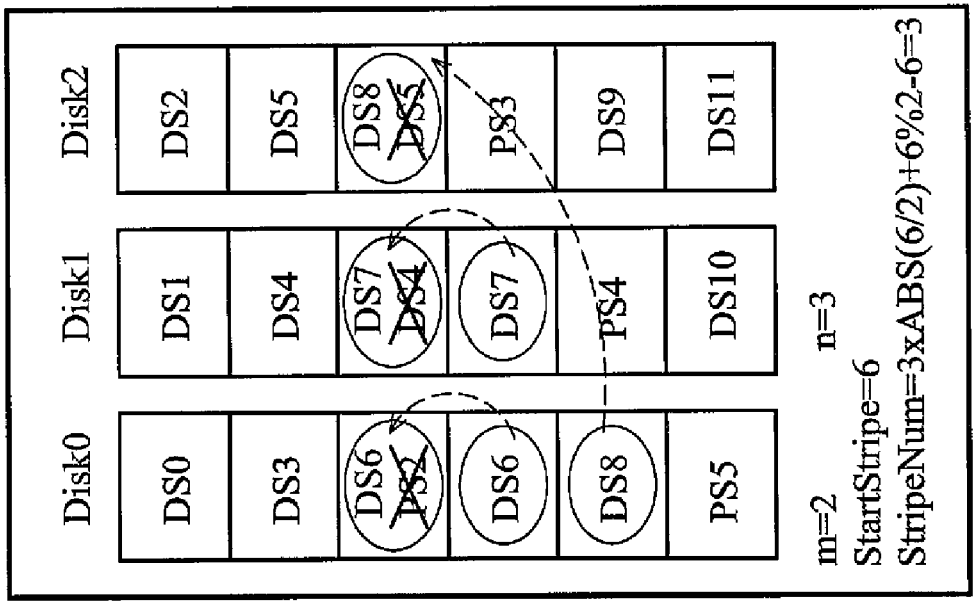
Figure 10C:
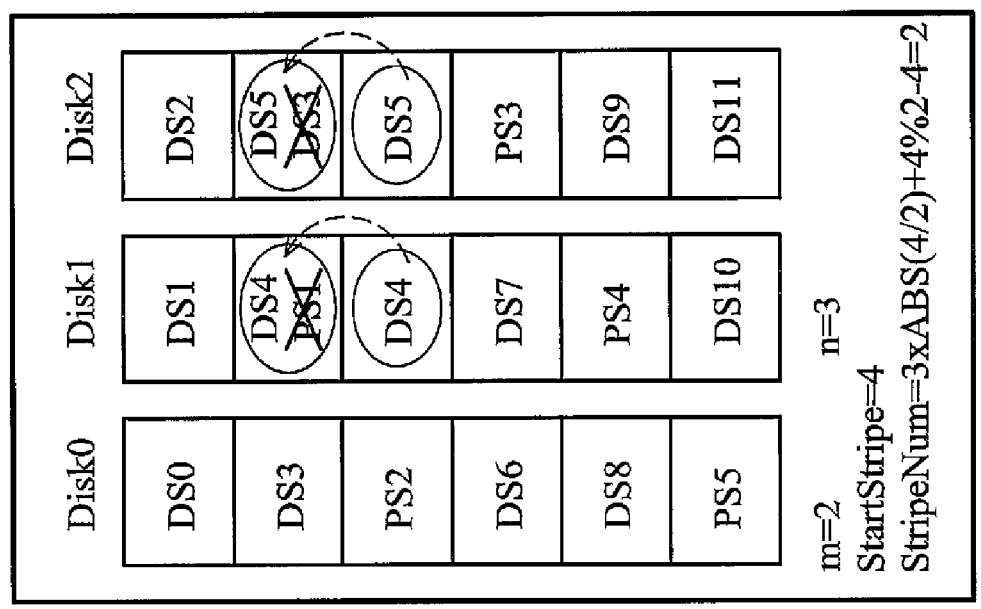
Figure 10F:
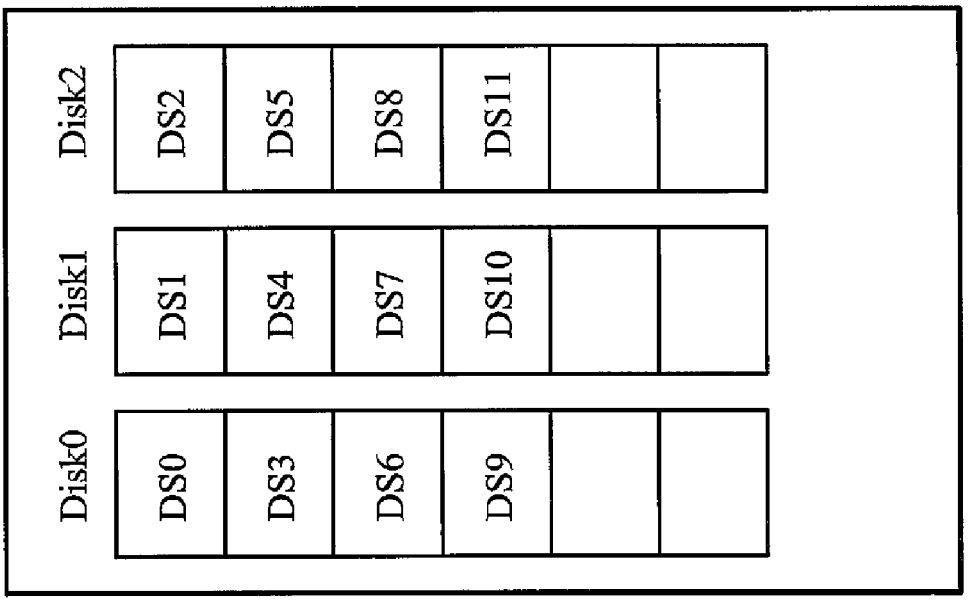
Figure 10E:
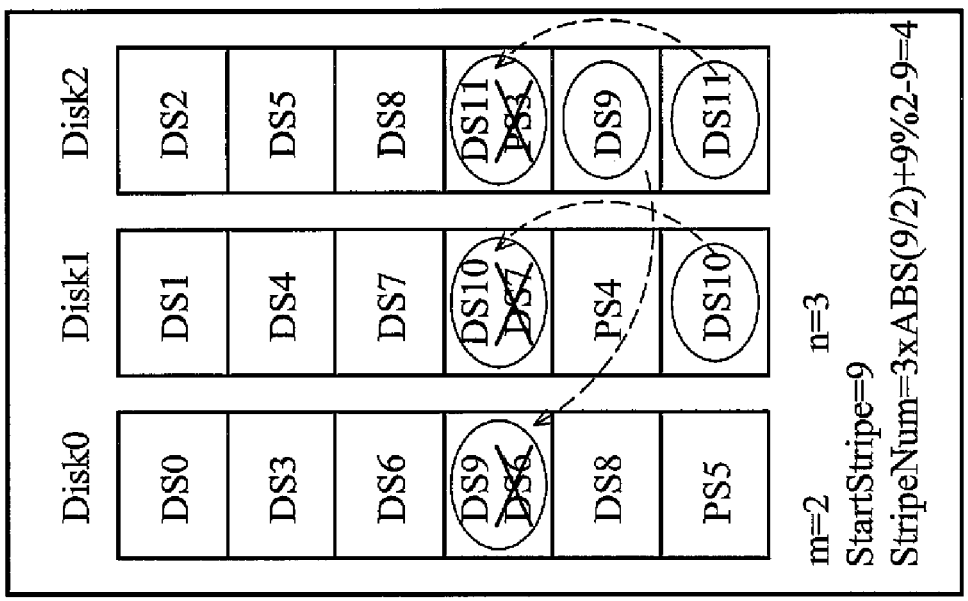

Detailed descriptions of examples for data migration of independent storage device adaptation are provided. Suppose that original RAID5 storage unit contains three independent disks Disk0 to Disk2, and the RAID0 storage unit also contains three independent disks Disk0 to Disk2 after adaptation. FIGS. 10a to 10f are diagrams illustrating data migration of RAID5 to RAID0 adaptation at different times. In this example, an independent disk quantity "m" is 2 before adaptation because the RAID5 storage unit utilizes capacity of one independent disk to store parity data, and an independent disk quantity "n" is 3 after adaptation because the RAID0 storage unit does not store parity data. Referring to FIG. 10a, in a first migration batch, the quantity of data stripes for migration "StripeNum" is set to 3 (referring to step S735 of FIG. 7a). Only user data of a data stripe DS2, however, is duplicated and stored in a relevant region of a disk Disk2 because data stripes DS0 to DS1 are already present in designated regions. Referring to FIG. 10b, in a second migration batch, the calculated data stripe migration quantity "StripeNum" is 1 (referring to step S733 of FIG. 7a), thus, user data of a data stripe DS3 is duplicated and stored in a relevant region of a disk Disk0. Referring to FIG. 10c, in a third migration batch, the calculated data stripe migration quantity "StripeNum" is 2 (referring to step S733 of FIG. 7a), thus, user data of data stripes DS4 and DS5 is duplicated and stored in relevant regions of disks Disk1 and Disk2 in sequence. Referring to FIG. 10d, in a fourth migration batch, the calculated data stripe migration quantity "StripeNum" is 3 (referring to step S733 of FIG. 7a), thus, user data of data stripes DS6 to DS8 is duplicated and stored in relevant regions of disks Disk0 to Disk2 in sequence. Referring to FIG. 10e, in a fifth migration batch, the calculated data stripe migration quantity "StripeNum" is 4 (referring to step S733 of FIG. 7a). Only user data of data stripes DS9 to DS11, however, is duplicated and stored in relevant regions of disks Disk0 to Disk2 because only three data stripes remain. It is to be understood that, after data migration of five batches, user data and parity data subsequent to and including original data stripe DS8 are erased, the results as shown in FIG. 10f.

Systems and methods, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer system and the like, the machine becomes an apparatus for practicing the invention. The disclosed methods and apparatuses may also be embodied in the form of program code transmitted over some transmission medium, such as electrical wiring or cabling, through fiber optics, or via any other form of transmission, wherein, when the program code is received and loaded into and executed by a machine, such as a computer or an optical storage device, the machine becomes an apparatus for practicing the invention. When implemented on a general-purpose processor, the program code combines with the processor to provide a unique apparatus that operates analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. A method of data migration for independent storage device expansion and adaptation, migrating user data of a first storage unit being pre-expanded or pre-adapted to relevant regions of a second storage unit being post-expanded or post-adapted in a plurality of batches, comprising:

during each batch, providing a number corresponding to a start data stripe of the first storage unit, wherein the step for providing the number corresponding to the start data stripe further comprises: acquiring a start sector number; and calculating the number corresponding to the start data stripe using a formula, StartStripe=ABS(pStartSector/Nstripe), where "StartStripe" represents the number corresponding to the start data stripe, ABS( ) represents a function acquiring a absolute value, "pStartSector" represents the start sector number, and "Nstripe" represents a total number of sectors of each data stripe;

determining a data stripe migration quantity; and duplicating and storing user data of data stripes of the determined data stripe migration quantity subsequent to and including the start data stripe of the first storage unit in relevant regions of the second storage unit, wherein, subsequent to duplicating and storing each batch, the user data of data stripes of the determined data stripe migration quantity subsequent to and including the start data stripe of the first storage unit is not overwritten;

wherein the number of independent storage devices comprised in the second storage unit is equal to or larger than the number of independent storage devices comprised in the first storage unit.

2. The method as claimed in claim 1 wherein the first storage unit comprises a plurality of first independent storage devices, the second storage unit comprises the first independent storage devices and at least one second independent storage device, the first and second independent storage devices only contain the data stripes, and the step for determining data stripe migration quantity further comprises:

determining whether the batch is a first batch;

when the batch is a first batch, setting the quantity of data stripes for migration to a quantity of the first and second independent storage devices storing user data; and when the batch is not a first batch, calculating the quantity of data stripes for migration using a formula, StripeNum=n×ABS(StartStripe/m)+StartStripe % m−StartStripe, where "StripeNum" represents the quantity of data stripes for migration, ABS( ) represents a function for acquiring a absolute value, "StartStripe" represents the number corresponding to the start data stripe, "n" represents a quantity of the first and second independent storage devices storing user data, and "m" represents a quantity of the first independent storage devices storing user data.

3. The method as claimed in claim 1 wherein the first storage unit comprises a plurality of first independent storage devices, the second storage unit comprises the first independent storage devices and at least one second independent storage device, the first and second independent storage devices contain the data stripes and a plurality of parity stripes, each parity stripe stores a plurality of parities, each parity corresponds to at least two of user data of the data stripes, and the step for determining data stripe migration quantity further comprises:

determining whether the batch is a first batch in each batch;

when the batch is a first batch, setting the quantity of data stripes for migration to a quantity of the first and second independent storage devices storing user data; and when the batch is not a first batch, calculating the quantity of data stripes for migration using a formula, StripeNum=n×ABS(StartStripe/m)+StartStripe % m−StartStripe, where "StripeNum" represents the quantity of data stripes for migration, ABS( ) represents a function for acquiring a absolute value, "StartStripe" represents the number corresponding to the start data stripe, "n" represents a quantity of the first and second independent storage devices storing user data, and "m" represents a quantity of the first independent storage devices storing user data.

4. The method as claimed in claim 1 wherein the first storage unit comprises a plurality of first independent storage devices, the second storage unit comprises the first independent storage devices and at least one second independent storage device, the independent storage devices of the first storage unit only contain the data stripes, the independent storage devices of the second independent storage unit contain the data stripes and a plurality of parity stripes, each parity stripe stores a plurality of parities, each parity corresponds to at least two of user data of the data stripes, and the step for determining data stripe migration quantity further comprises:

determining whether the batch is a first batch in each batch;
when the batch is a first batch, setting the quantity of data stripes for migration to a quantity of the first and second independent storage devices storing user data; and
when the batch is not a first batch, calculating the quantity of data stripes for migration using a formula, StripeNum=n×ABS(StartStripe/m)+StartStripe % m−StartStripe, where "StripeNum" represents the quantity of data stripes for migration, ABS( ) represents a function for acquiring a absolute value, "StartStripe" represents the number corresponding to the start data stripe, "n" represents a quantity of the first and second independent storage devices storing user data, and "m" represents a quantity of the first independent storage devices storing user data.

5. The method as claimed in claim 1 wherein the first storage unit comprises a plurality of independent storage devices, the second storage unit comprises the independent storage devices, the independent storage devices of the first storage unit contain the data stripes and a plurality of parity stripes, the independent storage devices of the second independent storage unit only contain the data stripes, each parity stripe stores a plurality of parities, each parity corresponds to at least two of user data of the data stripes, and the step for determining data stripe migration quantity further comprises:

determining whether the batch is a first batch in each batch;
when the batch is a first batch, setting the quantity of data stripes for migration to a quantity of the independent storage devices; and
when the batch is not a first batch, calculating the quantity of data stripes for migration using a formula, StripeNum=n×ABS(StartStripe/m)+StartStripe % m−StartStripe, where "StripeNum" represents the quantity of data stripes for migration, ABS( ) represents a function for acquiring a absolute value, "StartStripe" represents the number corresponding to the start data stripe, "n" represents a quantity of the independent storage devices, and "m" represents a quantity of the independent storage devices storing user data.

6. The method as claimed in claim 1 wherein the first storage unit and the second storage unit are redundant array of independent disks (RAID).

7. The method as claimed in claim 1 wherein the start sector number is stored in the last sector of the last independent storage device of the second storage unit.

8. The method as claimed in claim 1 wherein the step for duplicating and storing user data in relevant regions of the second storage unit further comprises:

grouping the data stripes of the quantity of data stripes for migration subsequent to and including the start data stripe into at least one session, where the capacity of which does not exceed the capacity of a buffer;
during each session, retrieving and storing user data of the data stripes of each session in the buffer; and
retrieving and storing user data of the data stripes of the buffer in relevant regions of the second storage unit.

9. The method as claimed in claim 8 wherein the step for retrieving and storing user data of the data stripes of each session in the buffer further comprises:

grouping the data stripes of the session into a plurality of read sessions according to the independent storage devices; and
during each read session, retrieving and storing user data of the data stripes of the same independent storage device in relevant regions of the buffer using a single read command.

10. A system of data migration for independent storage device expansion and adaptation, comprising:

a controller migrating user data of a first storage unit being pre-expanded or pre-adapted to relevant regions of a second storage unit being post-expanded or post-adapted in a plurality of batches, and, during each batch, providing a number corresponding to a start data stripe of the first storage unit, determining a data stripe migration quantity, and duplicating and storing user data of data stripes of the determined data stripe migration quantity subsequent to and including the start data stripe of the first storage unit in relevant regions of the second storage unit,
wherein the controller acquires a start sector number, and calculates the number corresponding to the start data stripe using a formula, StartStripe=ABS(pStartSector/Nstripe), where "StartStripe" represents the number corresponding to the start data stripe, ABS( ) represents a function acquiring a absolute value, "pStartSector" represents the start sector number, and "Nstripe" represents a total number of sectors of each data stripe;
wherein, subsequent to duplicating and storing each batch, the user data of data stripes of the determined data stripe migration quantity subsequent to and including the start data stripe of the first storage unit is not overwritten;
wherein the number of independent storage devices comprised in the second storage unit is equal to or larger than the number of independent storage devices comprised in the first storage unit.

11. The system as claimed in claim 10 wherein the first storage unit comprises a plurality of first independent storage devices, the second storage unit comprises the first independent storage devices and at least one second independent storage device, the first and second independent storage devices only contain the data stripes, the controller determines whether the batch is a first batch, when the batch is a first batch, sets the quantity of data stripes for migration to a quantity of the first and second independent storage devices storing user data, and, when the batch is not a first batch, calculates the quantity of data stripes for migration using a formula, StripeNum=n×ABS(StartStripe/m)+StartStripe % m−StartStripe, where "StripeNum" represents the quantity of data stripes for migration, ABS( ) represents a function for acquiring a absolute value, "StartStripe" represents the number corresponding to the start data stripe, "n" represents a quantity of the first and second independent storage devices storing user data, and "m" represents a quantity of the first independent storage devices storing user data.

12. The system as claimed in claim 10 wherein the first storage unit comprises a plurality of first independent storage devices, the second storage unit comprises the first independent storage devices and at least one second independent storage device, the first and second independent storage devices contain the data stripes and a plurality of parity stripes, each parity stripe stores a plurality of parities, each parity corresponds to at least two of user data of the data stripes, the controller determines whether the batch is a first batch in each batch, when the batch is a first batch, sets the quantity of data stripes for migration to a quantity of the first and second independent storage devices storing user data, and, when the batch is not a first batch, calculates the quantity of data stripes for migration using a formula, StripeNum=n×ABS(StartStripe/m)+StartStripe % m−StartStripe, where "StripeNum" represents the quantity of data stripes for migration, ABS( ) represents a function for acquiring a absolute value, "StartStripe" represents the number corresponding to the start data stripe, "n" represents a quantity of the first and second independent storage devices storing user data, and "m" represents a quantity of the first independent storage devices storing user data.

13. The system as claimed in claim 10 wherein the first storage unit comprises a plurality of first independent storage devices, the second storage unit comprises the first independent storage devices and at least one second independent storage device, the independent storage devices of the first storage unit only contain the data stripes, the independent storage devices of the second independent storage unit contain the data stripes and a plurality of parity stripes, each parity stripe stores a plurality of parities, each parity corresponds to at least two of user data of the data stripes, the controller determines whether the batch is a first batch in each batch, when the batch is a first batch, sets the quantity of data stripes for migration to a quantity of the first and second independent storage devices storing user data, and, when the batch is not a first batch, calculates the quantity of data stripes for migration using a formula, StripeNum=n×ABS(StartStripe/m)+StartStripe % m−StartStripe, where "StripeNum" represents the quantity of data stripes for migration, ABS( ) represents a function for acquiring a absolute value, "StartStripe" represents the number corresponding to the start data stripe, "n" represents a quantity of the first and second independent storage devices storing user data, and "m" represents a quantity of the first independent storage devices storing user data.

14. The system as claimed in claim 10 wherein the first storage unit comprises a plurality of independent storage devices, the second storage unit comprises the independent storage devices, the independent storage devices of the first storage unit contain the data stripes and a plurality of parity stripes, the independent storage devices of the second independent storage unit only contain the data stripes, each parity stripe stores a plurality of parities, each parity corresponds to at least two of user data of the data stripes, the controller determines whether the batch is a first batch in each batch, when the batch is a first batch, sets the quantity of data stripes for migration to a quantity of the independent storage devices, and, when the batch is not a first batch, calculates the quantity of data stripes for migration using a formula, StripeNum=n×ABS(StartStripe/m)+StartStripe % m−StartStripe, where "StripeNum" represents the quantity of data stripes for migration, ABS( ) represents a function for acquiring a absolute value, "StartStripe" represents the number corresponding to the start data stripe, "n" represents a quantity of the independent storage devices, and "m" represents a quantity of the independent storage devices storing user data.

15. The system as claimed in claim 10 wherein the first storage unit and the second storage unit are redundant array of independent disks (RAID).

16. The system as claimed in claim 10 wherein the start sector number is stored in the last sector of the last independent storage device of the second storage unit.

17. The system as claimed in claim 10 wherein the controller groups the data stripes of the quantity of data stripes for migration subsequent to and including the start data stripe into at least one session, the capacity of which does not exceed that of a buffer, and, during each session, retrieves and stores user data of the data stripes in the buffer, and retrieves and stores user data of the data stripes of the buffer in relevant regions of the second storage unit.

18. The system as claimed in claim 17 wherein the controller groups the data stripes of the session into a plurality of read sessions according to the independent storage devices, and, during each read session, retrieves and stores user data of the data stripes of the same independent storage device in relevant regions of the buffer using a single read command.

* * * * *